United States Patent
Zhang et al.

(10) Patent No.: US 8,248,775 B2
(45) Date of Patent: Aug. 21, 2012

(54) MOUNTING APPARATUS WITH PIVOTABLE LATCH MEMBER TO LOCK DATA STORAGE DEVICE

(75) Inventors: Guang-Yi Zhang, Shenzhen (CN); Zhe Zhang, Shenzhen (CN); Hai-Chen Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 273 days.

(21) Appl. No.: 12/649,291

(22) Filed: Dec. 29, 2009

(65) Prior Publication Data
US 2011/0095153 A1   Apr. 28, 2011

(51) Int. Cl.
*G06F 1/16* (2006.01)
*H05K 5/00* (2006.01)
*H05K 7/00* (2006.01)

(52) U.S. Cl. ......... 361/679.33; 361/679.01; 361/679.37; 361/679.39; 248/27.1; 312/223.1

(58) Field of Classification Search ............ 248/222.11, 248/222.12, 27.1, 225.11; 312/223.1, 332.1, 312/348.1, 330.1; 361/679.39, 679.37, 679.01, 361/679.33
See application file for complete search history.

(56) References Cited

U.S. PATENT DOCUMENTS

| | | | | |
|---|---|---|---|---|
| 5,751,551 A * | 5/1998 | Hileman et al. | ............... | 361/753 |
| 6,185,106 B1 * | 2/2001 | Mueller | ........................ | 361/798 |
| 6,193,339 B1 * | 2/2001 | Behl et al. | .................. | 312/223.2 |
| 6,270,174 B1 * | 8/2001 | Nishi | ........................ | 312/223.1 |
| 6,356,441 B1 * | 3/2002 | Claprood | ................. | 361/679.33 |
| 6,565,163 B2 * | 5/2003 | Behl et al. | .................. | 312/223.1 |
| 6,774,808 B1 | 8/2004 | Hibbs et al. | | |
| 6,826,056 B2 * | 11/2004 | Tsuyuki et al. | ............... | 361/725 |
| 7,023,693 B2 * | 4/2006 | Yuan et al. | ............... | 361/679.39 |
| 7,782,606 B2 * | 8/2010 | Baker et al. | ............... | 361/679.39 |
| 8,009,425 B2 * | 8/2011 | Kang | ........................ | 361/679.58 |
| 2007/0205702 A1 | 9/2007 | Hsu | | |

* cited by examiner

*Primary Examiner* — Nkeisha Smith
(74) *Attorney, Agent, or Firm* — Altis Law Group, Inc.

(57) ABSTRACT

A mounting apparatus includes a bracket for accommodating a data storage device, a first latch member, a second latch member, and a lock member. The bracket includes a pair of cutouts defined in opposite sides of the bracket. The first latch member is pivotably attached to a first end of the bracket and includes a pair of first latches movably extending in one of the pair of cutouts. The second latch member is pivotably attached to a second end of the bracket and includes a pair of second latches movably extending in the other one of the pair of cutouts. The second latch member is slidably attached to the first latch member. The lock member is slidably attached to the first latch member to releasably lock the first latch member to the bracket.

11 Claims, 6 Drawing Sheets

MOUNTING APPARATUS WITH PIVOTABLE LATCH MEMBER TO LOCK DATA STORAGE DEVICE

BACKGROUND

1. Technical Field

The disclosure relates to mounting apparatuses for data storage devices, and particularly to a mounting apparatus stably securing a data storage device in a computer enclosure.

2. Description of Related Art

A bracket accommodating a data storage device is usually installed in a rack in an enclosure of an electronic device. A single movable latch extends from the bracket to latch with the rack. This methodology can be unstable due to only one side of the rack being engaged.

DETAILED DESCRIPTION

Figure 1:
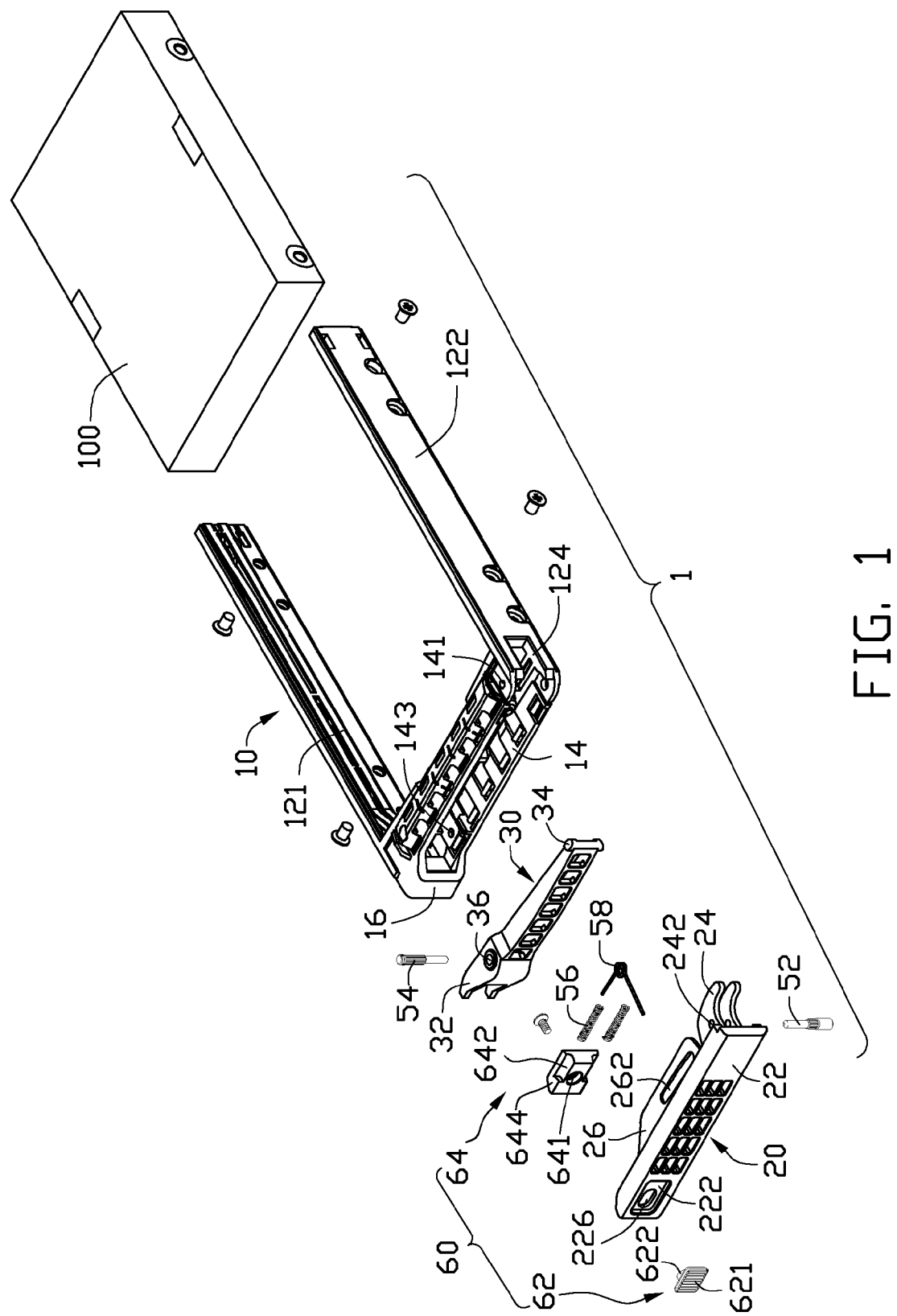
FIG. 1 is an exploded, isometric view of an exemplary embodiment of a mounting apparatus, together with a data storage device.
Figure 2:
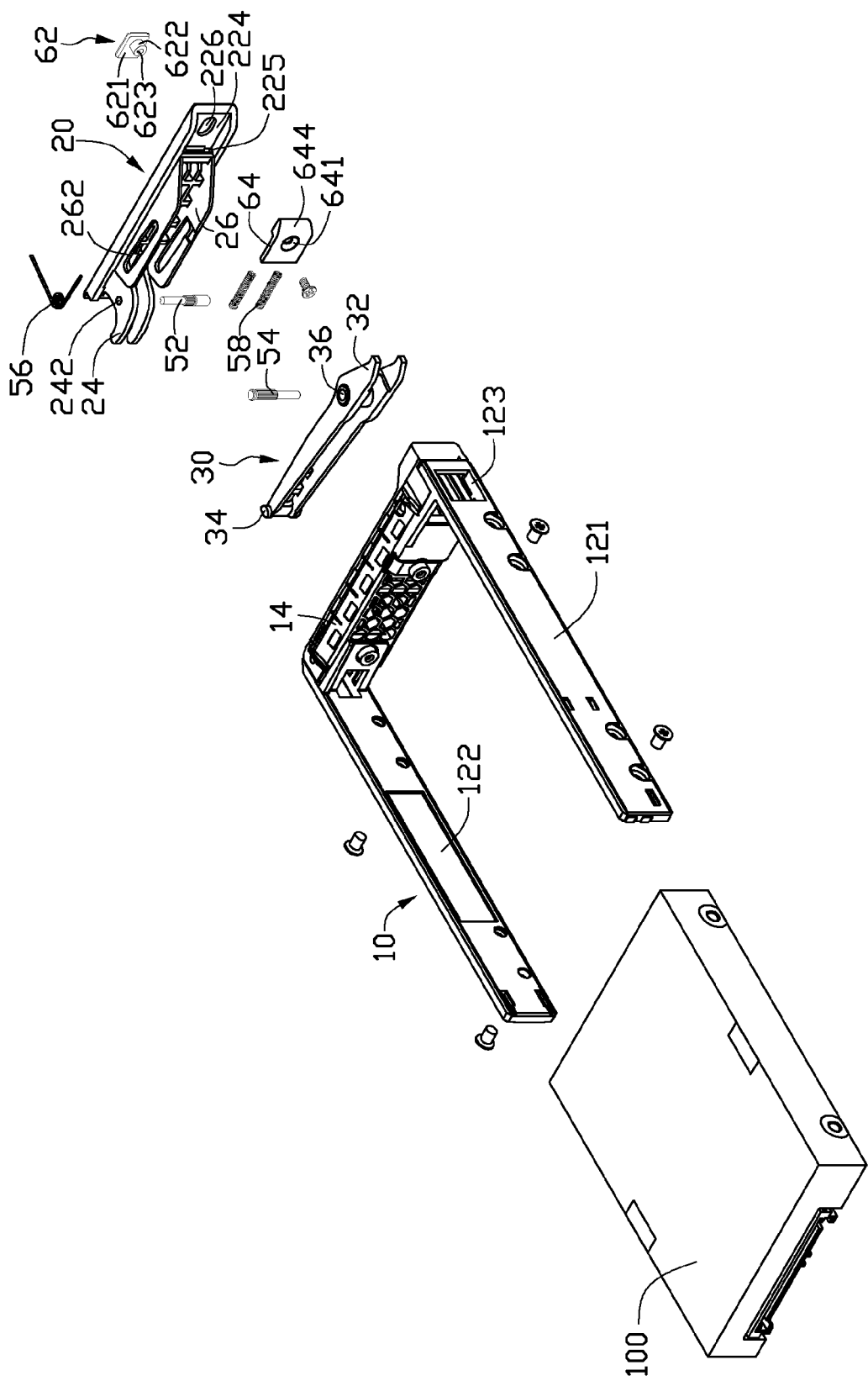
FIG. 2 is similar to FIG. 1, but viewed from another perspective.
Figure 3:
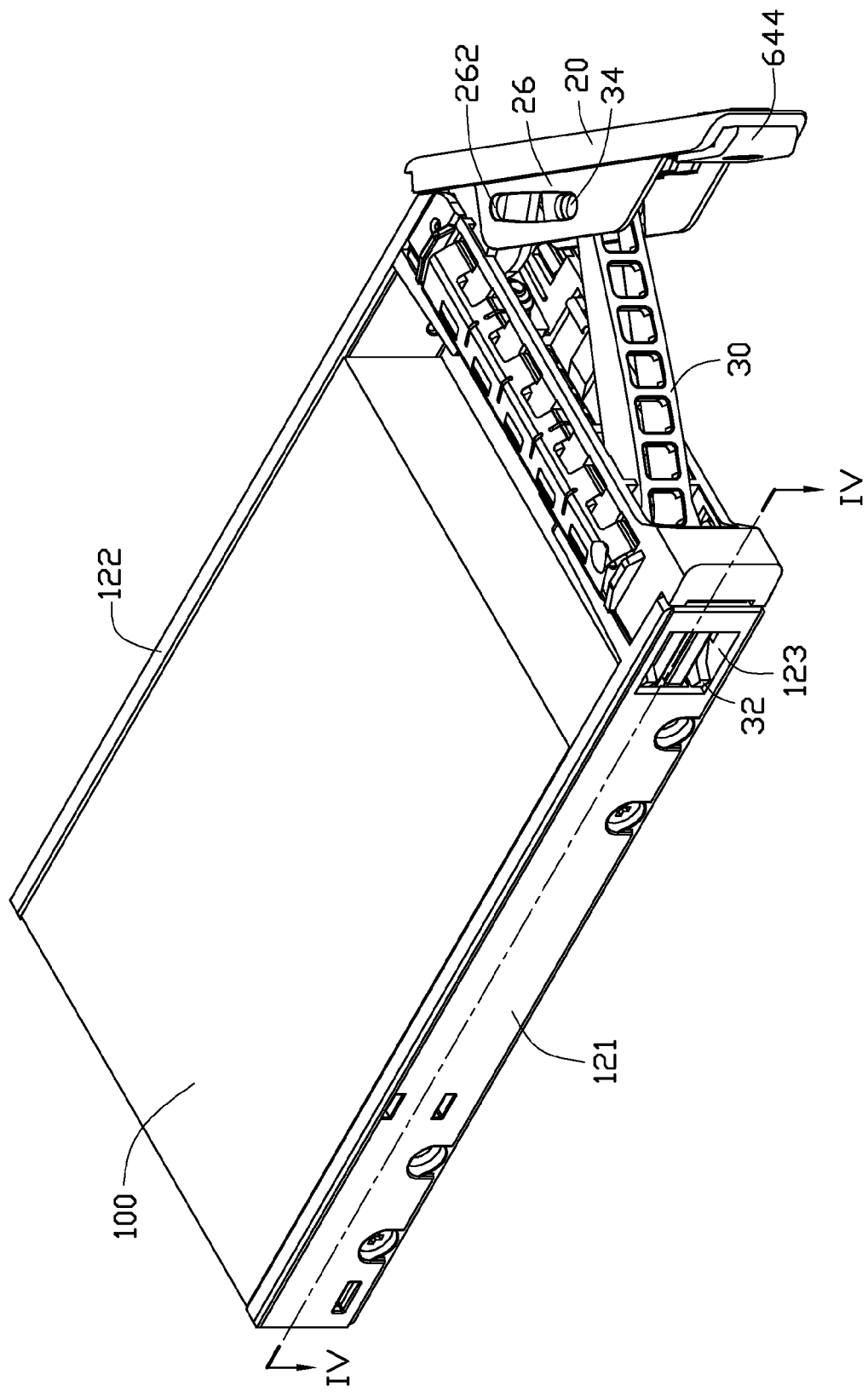
FIG. 3 is an assembled, isometric view of FIG. 1, showing the mounting apparatus in an open position.

Referring to FIGS. 1 and 2, an exemplary embodiment of a mounting apparatus 1 is provided to fix a data storage device 100 to a rack in an enclosure of an electronic device (not shown). The rack includes a pair of opposite sidewalls each defining a latch hole. The mounting apparatus 1 includes a bracket 10, a first latch member 20, a second latch member 30, a first pivot shaft 52, a second pivot shaft 54, a pair of first resilient members 56, a second resilient member 58, and a lock member 60. In this exemplary embodiment, the pair of first resilient members 56 is a pair of coil springs, and the second resilient member 58 is a torsion spring.

Figure 4:
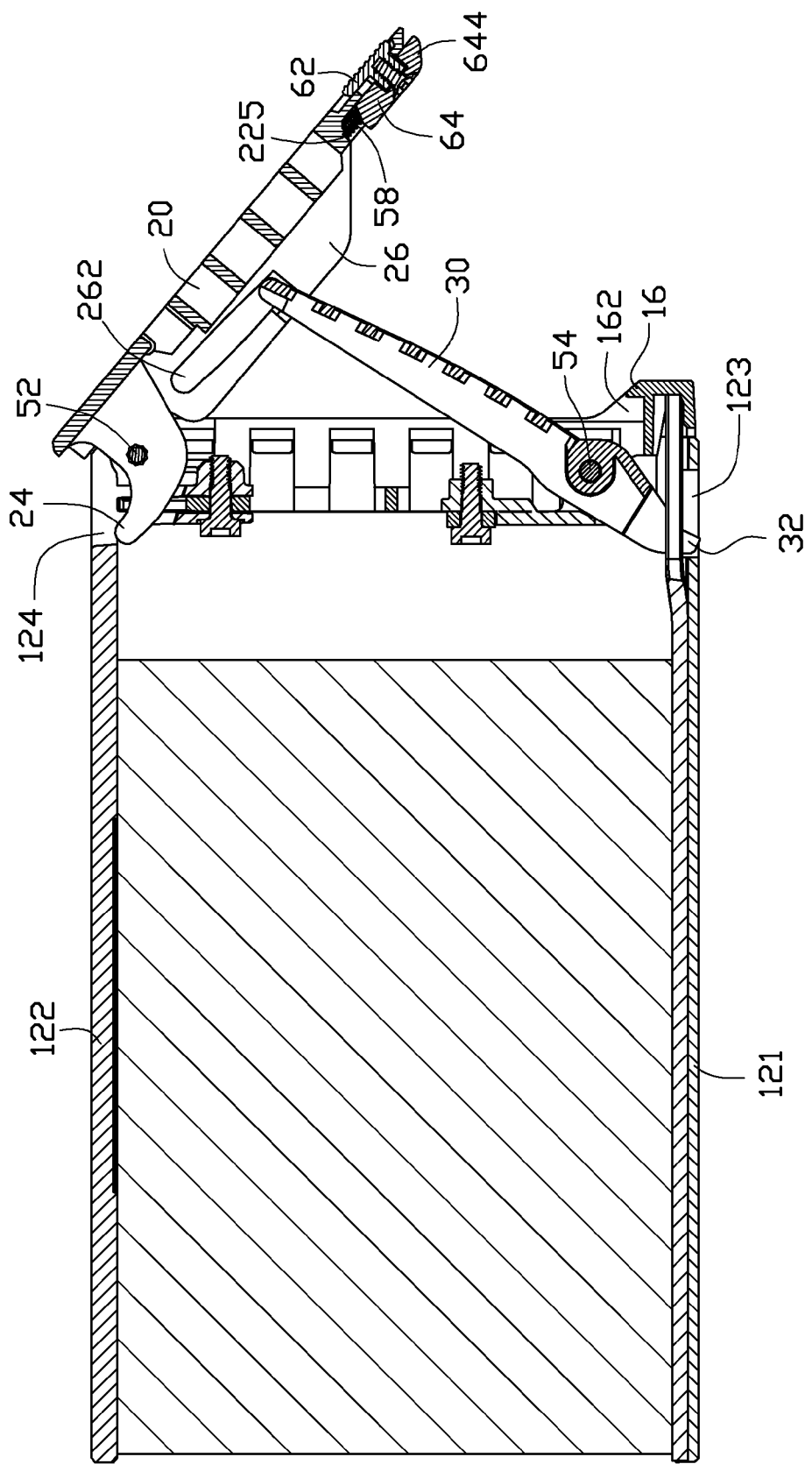
FIG. 4 is a cross-sectional view of FIG. 3, taken along the line IV-IV.

The bracket 10 includes opposite sidewalls 121, 122 for sandwiching the data storage device 100 therebetween, a pair of horizontal fixing plates 14 perpendicularly formed at the fronts of the sidewalls 121, 122, and a lock plate 16 connecting front edges of the fixing plates 14 near the sidewall 121 together. An opening is defined in the bracket 10 beside the lock plate 16. A receiving space is defined by the fixing plates 14, sidewalls 121,122, and the lock plate 16 to receive the first latch member 20 and the second latch member 30. A pair of first pivoting holes 141 and a pair of second pivoting holes 143 are respectively defined in opposite end portions of the fixing plates 14. A first cutout 123 is defined in the sidewall 121 and a second cutout 124 is defined in the sidewall 122 adjacent the opposite end portions of the fixing plates 14. Referring to FIG. 4, the lock plate 16 includes a slanting end, and a lock slot 162 is defined in the bracket 10, located behind a portion of the lock plate 16.

The first latch member 20 includes a bezel 22. A recess 222 is defined in a first end portion of the bezel 22. A first sliding slot 226 is defined in the recess 222. A pair of curved first latches 24 perpendicularly extends rearward from a second end portion of the bezel 22. A pivot hole 242 is defined in each of the first latches 24. A pair of spaced fixing tabs 26 perpendicularly extends rearward from a middle portion of the bezel 22. A second sliding slot 262 is defined in each of the fixing tabs 26. A pair of locating pins 225 extends from the first latch member 20, near an end portion of the fixing tabs 26 far away from the first latches 24.

The second latch member 30 includes a pair of sliding posts 34 extending from one end portion thereof, and a pair of triangular second latches 32 extending from the other end portion thereof. A pivot hole 36 is defined in the second latch member 30 adjacent the second latches 32.

The lock member 60 includes a push button 62 and a lock block 64. The push button 62 includes an operating tab 621, and a post 622 perpendicularly extending from a rear surface of the operating tab 621. A threaded hole 623 is defined in the post 622. A through hole 641 is defined in the lock block 64. A pair of fixing slots 642 is defined in a rear surface of the lock block 64, beside the through hole 641. A curved lock end 644 is formed at one end of the lock block 64.

In assembly, the first latch member 20 is pivotably attached to the bracket 10, with the first latches 24 extending through the second cutout 124 of the sidewall 122 of the bracket 10. The second resilient member 58 is disposed between first latches 24. The first shaft 52 extends through the first pivoting holes 141 of the bracket 10, the pivot holes 242 of the first latch member 20, and the second resilient member 58. Two extension legs of the second resilient member 58 abut against the bracket 10 and the first latch member 20. The second latches 32 of the second latch member 30 are received in the second cutout 123 of the sidewall 121 of the bracket 10 and the sliding posts 34 of the second latch member 30 are slidably received in the second sliding slots 262. The second pivot shaft 54 extends through the second pivoting holes 143 of the bracket 10 and the pivot hole 36 of the second latch member 30 to pivotably attach the second latch member 30 to the bracket 10. The push button 62 is received in the recess 222 of the first latch member 20 and the post 622 of the push button 62 slidably extends through the second sliding slot 226 of the first latch member 20. The pair of first resilient members 56 are received in the fixing slots 642 of the lock block 64. One end of each of the first resilient members 56 is fixed around one of the locating pins 225 of the first latch member 20. The other end of each of the first resilient members 56 abuts against a portion of the lock block 64 located at the inner end of the corresponding slot 642. A fastener extends through the through hole 641 of the lock block 64 to engage in the threaded hole 623 of the post 622 of the push button 62. Thus, the lock member 60 is slidably attached to the first latch member 20.

The data storage device 100 is sandwiched between the sidewalls 121, 122 of the bracket 10 and securely fixed in the bracket 10 by conventional fasteners, such as screws.

Figure 5:
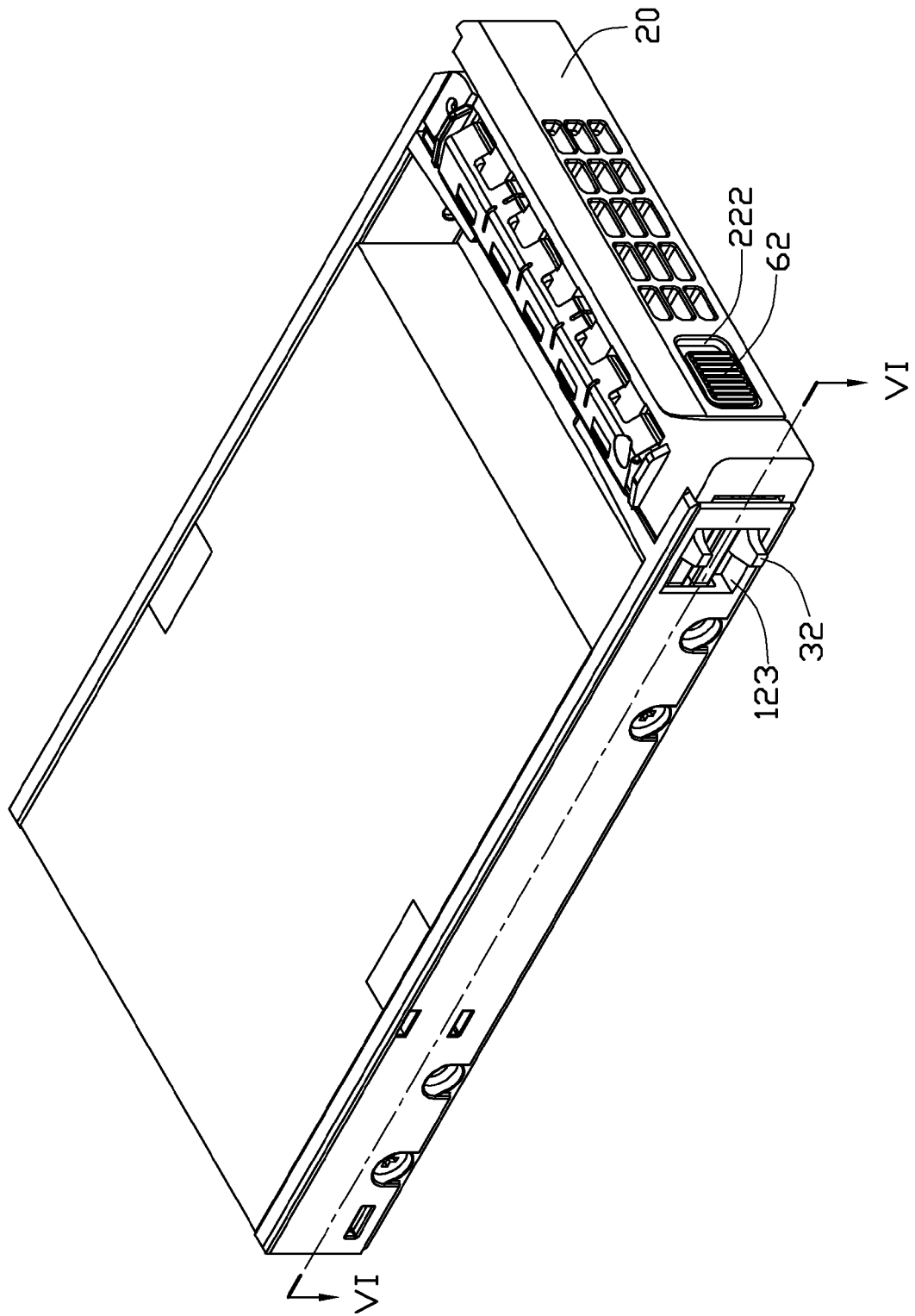
FIG. 5 is similar to FIG. 3, showing the mounting apparatus in a closed position.
Figure 6:
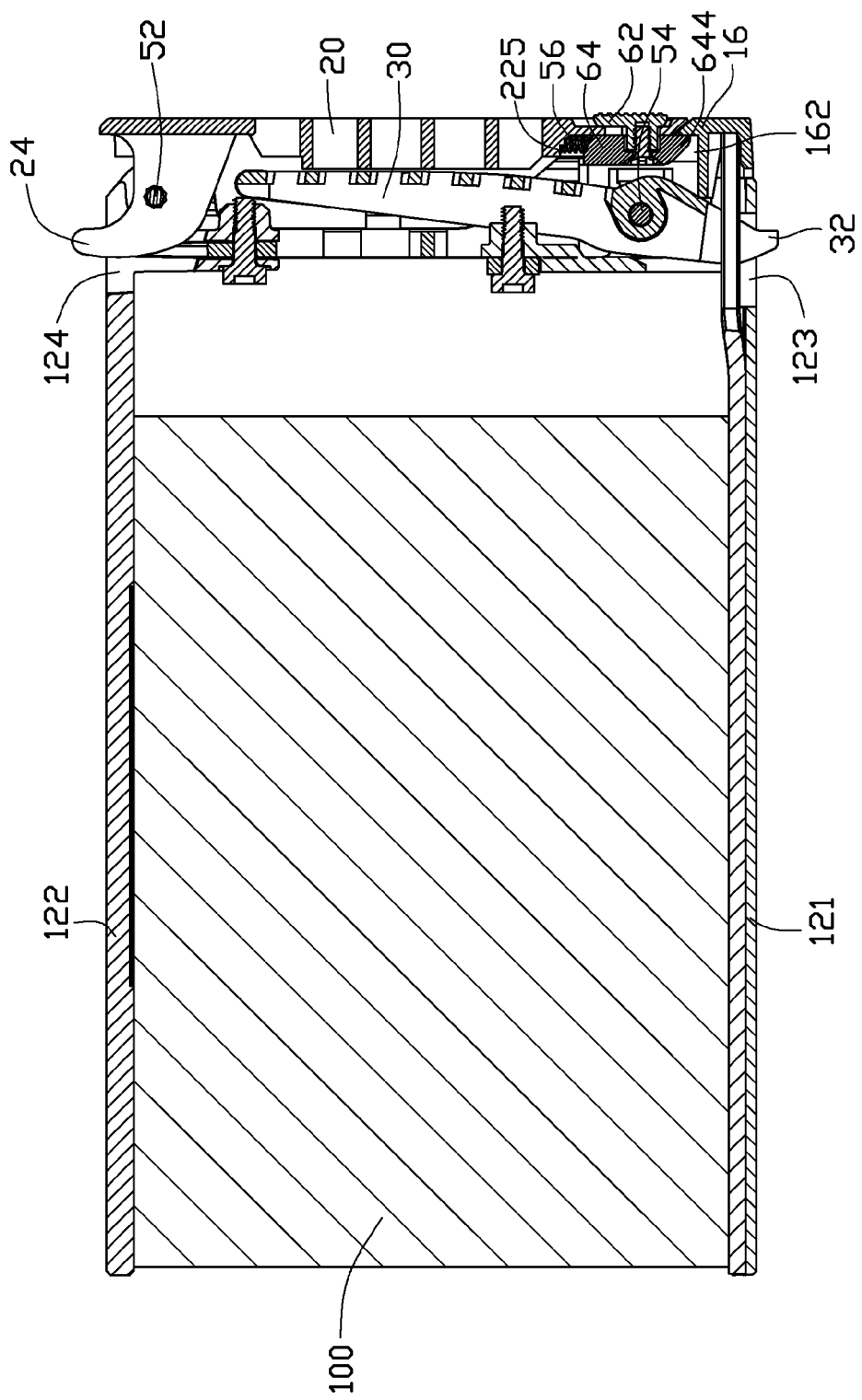
FIG. 6 is a cross-sectional view of FIG. 5, taken along the line VI-VI.

Referring to FIG. 4 to FIG. 6, when the mounting apparatus 1 together with the data storage device 100 are inserted into the rack, the first latch member 20 is pivoted toward the bracket 10 and the first resilient member 56 is resiliently deformed. The sliding posts 34 of the second latch member 30 is urged to slide in the second sliding slots 262 so that the second latch member 30 is also pivoted towards the bracket 10. The first latches 24 of the first latch member 20 gradually extend out of the cutout 124 of the sidewall 122 of the bracket 10 and the second latches 32 of the second latch member 30 gradually extend out of the cutout 123 of the sidewall 121 of the bracket 10, to respectively engage with the latch holes of the two sidewalls of the rack. When the lock end 644 of the lock member 60 abuts against the slanting end of the lock plate 16 of the bracket 10, the second resilient members 58 are compressed so that the lock member 60 is slid into the first latch member 20. When the lock end 644 extends into the lock slot 162 of the bracket 10, the second resilient members 58 are restored so that the lock end 644 of the lock member 60 slides to abut against the inner side of the lock plate 16. Thus, the first latch member 20 is locked to the bracket 10. This can stably fix the data storage device 100 in the rack.

To detach the mounting apparatus 1 together with the data storage device 100 from the rack, the lock member 60 is pushed away from the lock plate 16 of the bracket 10 to release the lock end 644 of the lock member 60 from the lock plate 16 of the bracket 10. The second resilient member 58 restores to pivot the first latch member 20 away from the bracket 10. The sliding posts 34 of the second latch member 30 slide in the second sliding slot 262 of the first latch member 20 so that the second latch member 30 also pivot away from the bracket 10. The first latches 24 of the first latch member 20 and the second latches 32 of the second latch member 30 are withdrawn from the latch holes of the rack and the first and second cutouts 123, 124, and extended into the bracket 10. This can stably detach the data storage device 100 from the rack.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the mounting apparatus comprising:
    a bracket for accommodating the data storage device therein, the bracket comprising a pair of cutouts defined in opposite sides thereof;
    a first latch member pivotably attached to a first end of the bracket and comprising a bezel, and a pair of first latches extending from the bezel and movably engaging in one of the pair of cutouts;
    a second latch member pivotably attached to a second end of the bracket opposite to the first end and comprising a pair of second latches movably extending in the other one of the pair of cutouts, the second latch member slidably attached to the first latch member; and
    a lock member slidably attached to the first latch member to releasably lock the first latch member to the bracket;
    wherein the first latch member is pivoted to pivot the second latch member in order to drive the pairs of first and second latches to extend out of or withdraw in the pair of cutouts.

2. The mounting apparatus of claim 1, wherein the bracket comprises a pair of sidewalls for sandwiching the data storage device therebetween, the pair of cutouts is respectively defined in fronts of the sidewalls.

3. The mounting apparatus of claim 2, wherein a pair of fixing plates is perpendicularly formed at the fronts of the sidewalls, a pair of first pivot holes and a pair of second pivot holes are respectively defined in two end portions of the fixing plates to pivotably engage with the first latch member and the second latch member.

4. The mounting apparatus of claim 3, wherein the pair of first latches perpendicularly extends from the bezel and each of the pair of pair of first latches defines a pivot hole, a torsion spring is sandwiched between the first latches, a shaft extends through the pivot holes of the pair of first latches, the first pivot holes of the bracket and the torsion spring to pivotably attach the first latch member to the bracket.

5. The mounting apparatus of claim 3, wherein the second latch member comprises a pivot hole defined therein near the pair of second latches, a shaft extends through the pivot holes of the second latch member and the second pivot holes of the bracket to pivotably attach the second latch member to the bracket.

6. The mounting apparatus of claim 1, wherein the first latch member comprises a bezel, the bezel comprises a pair of spaced fixing tabs perpendicularly extending therefrom, a sliding slot is defined in each of the pair of fixing tabs, a pair of sliding posts extends from one end portion of the pair of second latch member far away from the second latches to be slidably received in the sliding slots.

7. The mounting apparatus of claim 3, wherein a lock plate connects with front edges of the pair of fixing plates, a lock slot is defined in the bracket located behind the lock plate, the first latch member comprises a bezel, a recess is defined in the bezel, a sliding slot is defined in the bezel, the lock member slidably engages in the recess and the sliding slot and comprises a lock end to engage with the lock plate.

8. The mounting apparatus of claim 7, wherein the lock member comprises a push button slidably received in the recess of the first latch member, and a lock block attached to the push button, the lock end of the lock member is curved and formed at one end of the lock block.

9. The mounting apparatus of claim 8, wherein a pair of fixing slots is defined in the lock block for receiving a pair of coil springs, a pair of locating pins extends from the first latch member to position the coil springs.

10. The mounting apparatus of claim 9, wherein the push button comprises an operating tab and a post with a threaded hole perpendicularly extending from the operating tab, the lock block defines a through hole beside the fixing slots, a fastener extends through the through hole to engage in the threaded hole of the push button to fix the lock block to the push button.

11. A mounting apparatus for a data storage device, the mounting apparatus comprising:
    a bracket for accommodating the data storage device therein, the bracket comprising a pair of cutouts defined in opposite sides thereof;
    a first latch member pivotably attached to a first end of the bracket and comprising a pair of first latches movably engaging in one of the pair of cutouts;
    a second latch member pivotably attached to a second end of the bracket opposite to the first end and comprising a pair of second latches movably extending in the other one of the pair of cutouts, the second latch member slidably attached to the first latch member; and
    a lock member slidably attached to the first latch member to releasably lock the first latch member to the bracket;
    wherein the first latch member is pivoted to pivot the second latch member in order to drive the pairs of first and second latches to extend out of or withdraw in the pair of cutouts;
    wherein the bracket comprises a pair of sidewalls for sandwiching the data storage device therebetween, the pair of cutouts is respectively defined in fronts of the sidewalls;
    wherein a pair of fixing plates is perpendicularly formed at the fronts of the sidewalls, a pair of first pivot holes and a pair of second pivot holes are respectively defined in two end portions of the fixing plates to pivotably engage with the first latch member and the second latch member.

* * * * *